United States Patent
Brandt

[11] Patent Number: 6,002,330
[45] Date of Patent: Dec. 14, 1999

[54] CONTROL SYSTEM FOR VEHICLE LIGHTING

[75] Inventor: Brian E. Brandt, Milwaukee, Wis.

[73] Assignee: J. W. Speaker Corporation, Germantown, Wis.

[21] Appl. No.: 09/250,234

[22] Filed: Feb. 15, 1999

[51] Int. Cl.⁶ .................................................. B60Q 1/26
[52] U.S. Cl. ................. 340/468; 340/458; 340/641; 340/642; 340/475; 340/479; 340/477; 340/471; 307/10.8; 280/DIG. 14; 315/77
[58] Field of Search ................................. 340/468, 458, 340/641, 642, 475, 479, 477, 471; 307/10.8; 280/DIG. 14; 315/77

[56] References Cited

U.S. PATENT DOCUMENTS

| | | | |
|---|---|---|---|
| 3,849,664 | 11/1974 | Bryant | 307/10 LS |
| 3,909,075 | 9/1975 | Pittet, Jr. et al. | 303/24 C |
| 3,970,860 | 7/1976 | Purdy | 307/10 LS |
| 4,064,413 | 12/1977 | Andersen | 315/77 |
| 4,325,052 | 4/1982 | Koerner | 340/67 |
| 4,751,431 | 6/1988 | Ducote | 315/77 |
| 5,030,938 | 7/1991 | Bondzeit | 340/431 |
| 5,498,910 | 3/1996 | Hopkins et al. | 307/10.1 |
| 5,498,929 | 3/1996 | Formwalt, Jr. | 315/77 |
| 5,760,545 | 6/1998 | Mikel | 315/77 |
| 5,775,712 | 7/1997 | Link et al. | 280/422 |

*Primary Examiner*—Jeffery A. Hofsass
*Assistant Examiner*—Tai T. Nguyen
*Attorney, Agent, or Firm*—Quarles & Brady LLP

[57] ABSTRACT

A lighting system for a towed off-highway vehicle has a left and right hazard warning lamps that flash in unison when the vehicle is not turning. When the vehicle is turning, the hazard warning lamp on the side of the turn flashes, while the other hazard warning lamp is illuminated steadily. Left and right turn indicator lamps are operated by a control circuit that receives signals which operate the hazard warning lamps. The control circuit responds to those signals by rendering the turn indicator lamps inactive when the vehicle is not turning, and operates the left and right turn indicator lamps in the same manner as the left and right hazard warning lamps, respectively, when the vehicle is turning.

13 Claims, 4 Drawing Sheets

6,002,330

CONTROL SYSTEM FOR VEHICLE LIGHTING

BACKGROUND OF THE INVENTION

The present invention relates to warning light systems for off-highway vehicles, and more particularly to control systems for operating such warning lights.

Occasionally agricultural and construction equipment which is primarily intended for off-road use has to be driven on a highway between work locations. Because these vehicles move at relatively slow speed compared to highway vehicles, hazard warning lights are located at both the front and rear the vehicle. For example the American Society of Agriculture Engineers (ASAE) has promulgated standards which state that self-propelled equipment, for example a farm tractor or combine, have rear and forward facing amber lamps to provide a hazard warning. These lamps flash at a rate of 70 pulses per minute in unison while the equipment is moving in a straight path. The lamps also are utilized as turn indicators in which case the lamps on the side of the equipment in the direction of the turn flash at 100 pulses per minute and the lamps in the direction opposite to the turn are illuminated steadily. The tractor contains a circuitry which governs the operation of these lamps according to this standard.

It is quite common for such self-propelled equipment to pull an implement such as a wagon, manure spreader, hay bailer or other vehicle. The ASAE standards also dictate that the non-self propelled, or towed, vehicles have warning lights at its rear. In particular the towed implement must have a pair of tail lamps as well as left and right amber hazard warning lamps that function in unison with the corresponding hazard warning lamps on the tractor. The power signals for operating these lights on the towed vehicle are supplied through a standard electrical connector on the back of the tractor. The connector provides terminals for the signals from the right and left hazard lamps, tail lights and vehicle ground.

The ASAE standards require that an additional red or amber rear facing lamp be positioned on each side of the vehicle. When the equipment is not turning, the additional red or amber lamps are inactive and during a turn the additional lamps operate unison with the hazard lamps. Specifically the additional lamp on the side of the turn flashes at 100 pulses per minute while the opposite lamp is steadily illuminated. Because these additional lamps must remain inactive when a turn is not occurring, they cannot simply be connected in parallel with the other hazard lamps on the towed vehicle, but must be controlled separately. However, the connection between the tractor and the towed vehicle does not provide additional connection for these lamps. Therefore, control logic must be provided on the towed vehicle to derive signals from the hazard lamp signals in order to drive the turning lamps.

U.S. Pat. No. 5,498,929 describes one type of such control logic which employs a diode-resistor circuit to operate a relay that controls the flow of electricity through the additional turn indicator lamps on the towed vehicle. However, this circuit places the relay in the connection of the lamps to vehicle ground. This precludes the use of standard lamp assemblies on the towed vehicle. Such lamp assemblies have tail lamps, regular hazard warning lamps and the additional turn indicator lamps in a common housing with the grounds for all the lamps connected in common. With this previous control logic, a separate ground connection has to be provided for the additional turn indicator lamps, thereby requiring non-standard lamp assemblies.

SUMMARY OF THE INVENTION

A general object of the present invention is to provide control logic for deriving signals for operating the secondary lights on a off-highway vehicle being towed by a tractor.

Another object is to provide such control logic which can utilize with standard lamp assemblies.

These and other objectives are satisfied by a lighting system which includes a right hazard conductor for receiving a first signal from the towing vehicle and a left hazard conductor for receiving a second signal from the towing vehicle. A right hazard lamp is connected to the right hazard conductor for energizing by the first signal and a left hazard lamp is connected to the left hazard conductor for energizing by the second signal. Right and left turn indicator lamps also are provided.

A first switch selectively connects the right turn indicator lamp to the right hazard conductor and a second switch selectively connects the left turn indicator lamp to the left hazard conductor. A control circuit has inputs coupled to the right hazard conductor and the left hazard conductor and outputs connected to the first switch and the second switch. The control circuit responds to the first and second signals changing states substantially in synchronism by rendering the first switch and the second switch nonconductive. The control circuit also responds to the first and second signals changing states asynchronously by rendering the first switch and the second switch conductive. The response of the control circuit causes the right and left turn indicator lamps to function according to the ASAE standard.

DETAILED DESCRIPTION OF THE INVENTION

Figure 1:
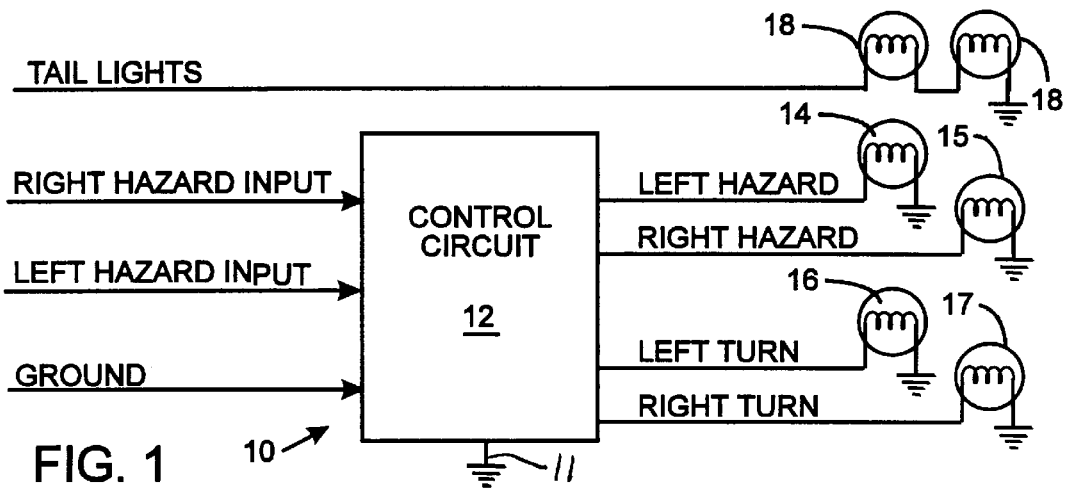
FIG. 1 is a block diagram of the lighting circuit for the towed vehicle.

FIG. 1 illustrates the lighting circuit 10 of a non-self propelled piece of off-highway equipment, such as a trailer or an vehicle used in agriculture. The tractor, which is towing this piece of equipment, produces electrical signals at a connector for powering the tail lights, left and right hazard lights and provides a ground connection. All of these inputs, with the exception of the one for the tail lights, are applied to the control circuit 12 on the towed vehicle. In response, the control circuit produces outputs for the left and right hazard lamps 14 and 15, and for a pair of left and right turn indicator lamps 16 and 17. The signals for the left and right turn indicator lamps are derived by the control circuit 12 from the LEFT and RIGHT hazard inputs, as will be described. The tail light signal is passed directly to a pair of tail lights 18 without being processed by the control circuit 12.

Figure 2:
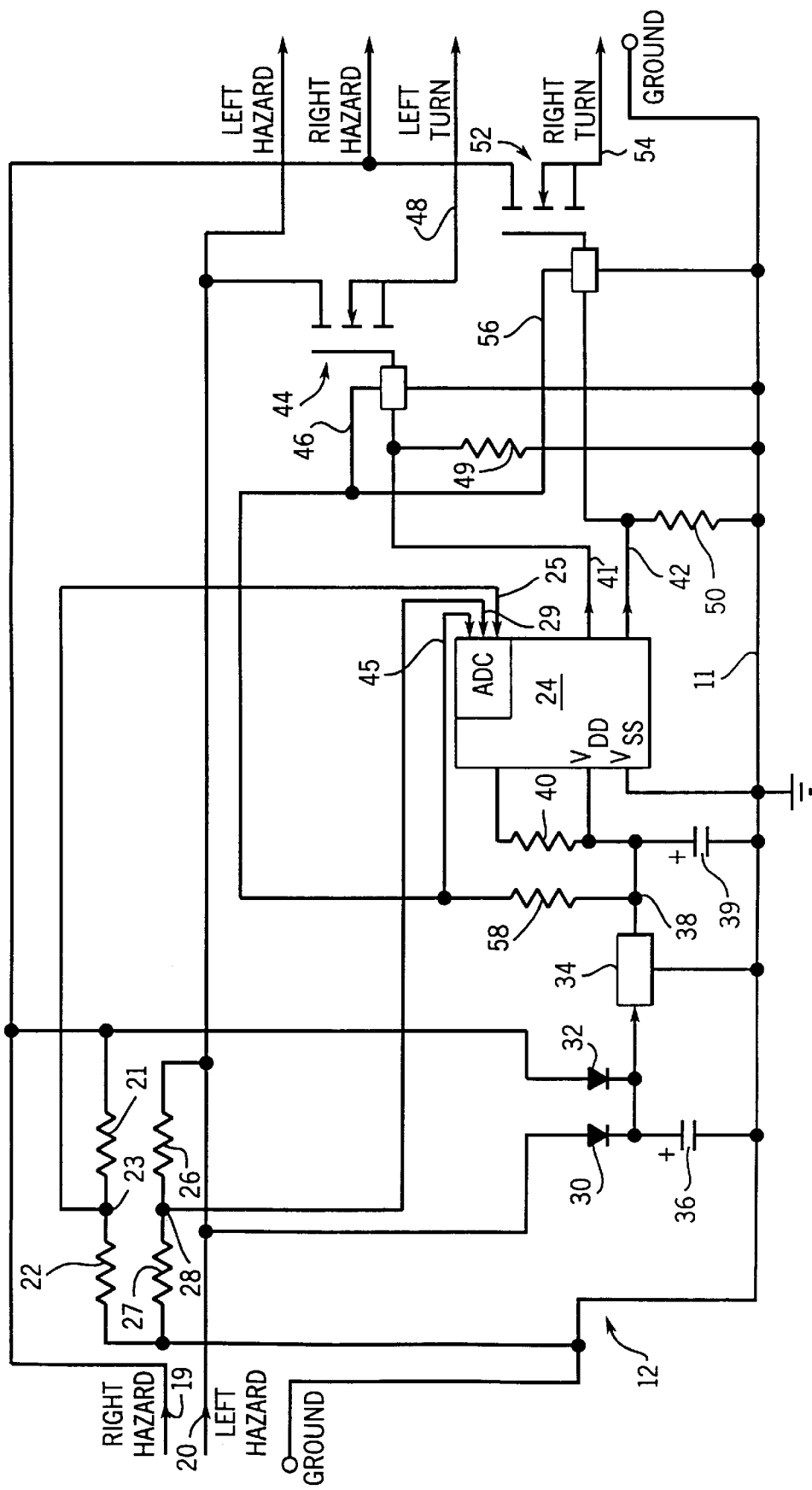
FIG. 2 is a schematic diagram of the control circuit shown in FIG. 1.

With reference to FIG. 2, the ground input (GND) is applied to a common ground conductor 11 for the control circuit 12 and all of the lamps 14–18. Both the right hazard terminal 19 and the left hazard terminal 20 are connected directly to LEFT and RIGHT hazard outputs of the controller. A first voltage divider extends between the right hazard terminal 19 and the ground conductor 11. The voltage divider is formed by resistors 21 and 22 connected in series with a node 23 in between, which is connected to an input 25 of a microcontroller 24, such as model PIC12C671-04P made by Microchip Technology, Inc. of Phoenix, Ariz., USA. Similarly a second voltage divider, formed by resistors 26 and 27 connected in series extends between the left hazard terminal 20 and ground conductor 11. The second voltage divider has an intermediate node 28, which is connected to another microcontroller input 29. The circuitry coupled to inputs 25 and 29 of the microcontroller provide a mechanism for sensing the RIGHT and LEFT hazard signals at terminals 19 and 20, as will be described.

Power is supplied to the microcontroller 24 by a voltage regulator 34. The input terminal of the voltage regulator 34 is coupled to the right and left hazard terminals 19 and 20 by separate diodes 30 and 32, respectively. The voltage regulator input terminal also is coupled to ground conductor 11 by a storage capacitor 36, which retains enough charge to maintain power to the microcontroller 24 between flashes of the hazard warning lights. The voltage regulator 34 produces an output at node 38 which is smoothed by capacitor 39 to provide power for operating microcontroller 24. Specifically, node 38 is connected to the positive, or $V_{DD}$ terminal of the microcontroller. The $V_{SS}$ terminal of the microcontroller 24 is connected directly to ground conductor 11. The positive supply voltage at node 38 is coupled by a resistor 40 to a reset input of the microcontroller 24 in order to hold the device out of reset during operation.

The microcontroller 24 has two outputs 41 and 42, respectively designated the LEFT and RIGHT outputs, for controlling the left and right turn indicators lamps 16 and 17. The LEFT output 41 is applied to the control electrode of a first field effect transistor 44, such as an "intelligent FET" type IR6226. This type of transistor includes internal sensors to detect over current and excessive temperature and produce an output signal on line 46 indicative of the transistor's condition. This transistor's control electrode also is coupled to ground by resistor 49. The conduction path of the first transistor 44 is connected between the left hazard terminal 20 and the LEFT turn indicator output 48 of the control circuit 12.

The RIGHT output 42 of the microcontroller 24 is coupled to ground by a resistor 50 and to the control electrode of a second field effect transistor 52 of the same type as the first transistor 44. The conduction path of the second transistor 52 is connected between the right hazard terminal 19 and the right turn indicator output 54. The second transistor 52 also has an internal current and temperature sensing circuit which produces an output on line 56 which is indicative of the second transistor's condition. The two condition signal lines 46 and 56 are connected together to a separate input 45 of the microcontroller 24, which is coupled by a pull-up resistor 58 to the positive voltage supply node 38.

When the hazard warning lights on the tractor are activated, the electrical signals from the left and right hazard warning lights are applied via a cable to the control circuit 12 in the vehicle. Part of the pulsating electric current is used by the voltage regulator 34 to provide power to the microcontroller 24. As noted previously, capacitor 36 at the input of the voltage regulator 34 stores a charge that is sufficient to maintain power to the microcontroller between each pulse of the electrical signals for the flashing hazard warning lights. When this power is first applied, the microcontroller 24 wakes up and begins executing a control program stored within its internal memory.

Figure 3:
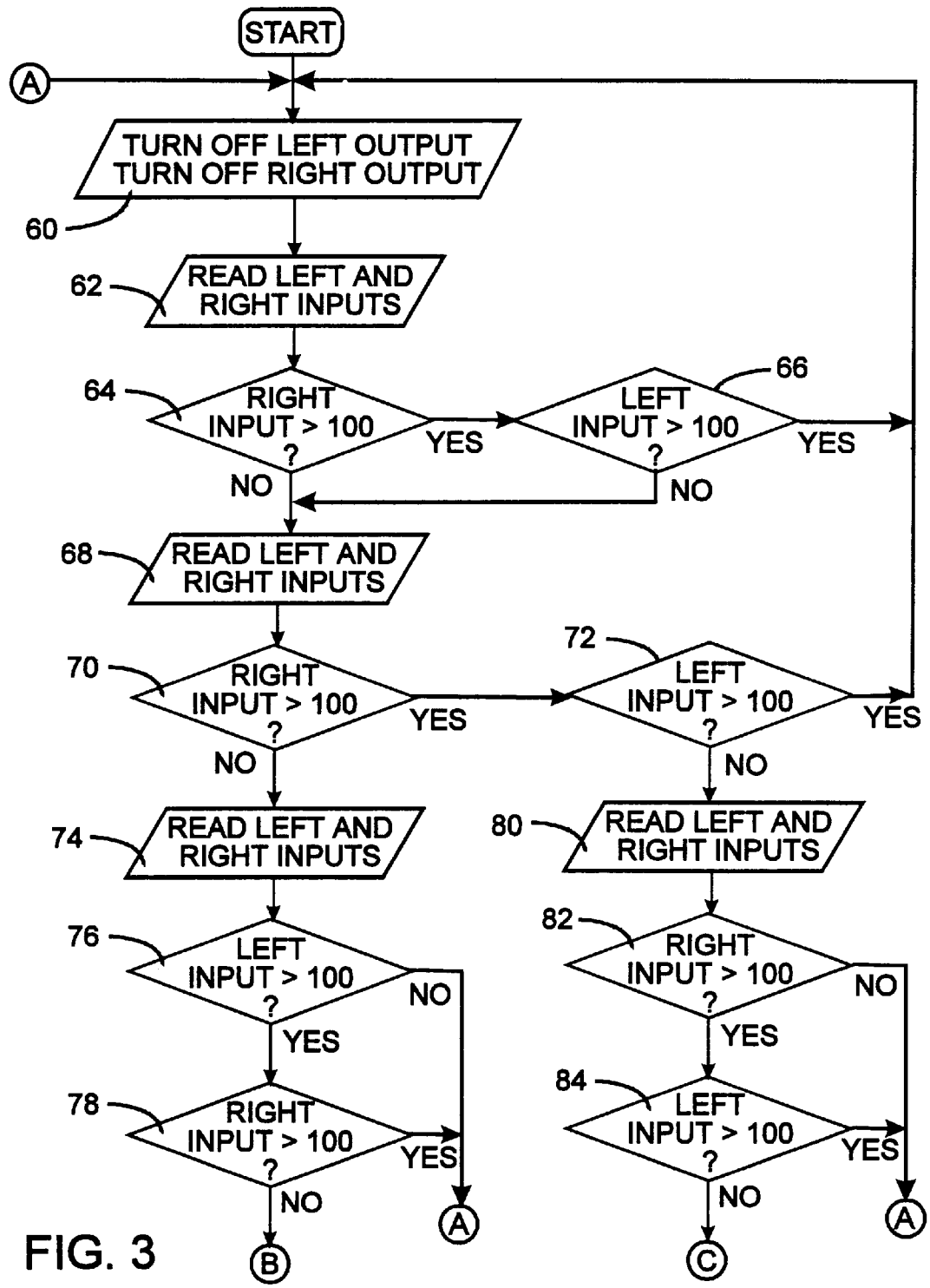

With reference to FIG. 3, the control program begins executing at step 60 where the LEFT and RIGHT outputs 41 and 42, respectively, of the microcontroller 24 are turned off. This renders transistors 44 and 52 non-conductive, thereby blocking current from flowing to the turn indicator lamps 16 and 17. Then at step 62, the microcontroller reads inputs 25 and 29 to determine the status of the LEFT and RIGHT hazard warning signals on the tractor. The analog voltage levels at these inputs are digitized by an internal eight bit analog-to-digital converter (ADC) in microcontroller 24. If one of the hazard warning signals is active, i.e. at the positive voltage level of the tractor's electrical system, the corresponding digitized value at the input of the microcontroller 24 will be greater than 100. This value is selected to be greater than a value which would be produced by electrical noise in the lighting system and thus prevents such noise from adversely affecting operation of the control circuit 12. Other digital values may be utilized to ensure noise rejection and the value also is dependent upon the number of bits produced by the analog-to-digital conversion.

The digital value from the right hazard terminal 19 is inspected at step 64 to determine if it is greater than 100. Thus, when that value exceeds this threshold at step 64, the program concludes that the right hazard warning lamp is illuminated and execution branches to step 66, where the LEFT hazard input 25 is similarly checked to determine if its digital value is greater than 100. When both the RIGHT and LEFT hazard warning inputs 25 and 29 are high, the program execution returns to step 60 where the LEFT and RIGHT outputs 41 and 42 for the vehicle's turn indicator lamps are turned off. Thus when both of the hazard warning lamps 14 and 15 are illuminated in unison, as occurs when the tractor is not turning, the turn indicator lamps 16 and 17 on the towed vehicle are inactive, or off, as per the ASAE standard.

If at either step 64 or 66 one of the hazard terminals 19 or 21 from the tractor has a digital value of 100 or less, indicating that the corresponding hazard warning lamp is off, the program execution branches to step 68. The RIGHT and LEFT hazard warning inputs 25 and 29 of the microcontroller 24 are read again in the event that the reading at step 62 occurred at a transition in the warning signals when one signal may have changed state before the other signal. Next at steps 70 and 72, the microcontroller 24 determines whether the digitized values of the RIGHT input 29 and the LEFT input both exceed 100. If that is the case, the program branches back to step 60 to ensure that the turn indicator outputs remain off, because the hazard inputs signals are changing states substantially in unison.

If at step 70, the value of the RIGHT input 25 is found to be below 100, both inputs are checked again at steps 74–78. When the LEFT input 29 is seen below 100 at step 76, the two hazard signals are in unison and the program returns to step 60. However, at step 76 microcontroller interprets the LEFT input 29 being above 100 and the RIGHT input 25 being below 100 as a indicating right turn condition.

If at step 72 the value of the LEFT input 29 is found below 100, both inputs are checked again at steps 80–84. At step 82, if the RIGHT input 25 is found to be below 100, the two hazard signals are in unison and the program execution returns to step 60. Otherwise when RIGHT input 25 is above 100, the execution advances to step 84 at which the LEFT input 29 being below 100 is interpreted as indicating a left turn condition.

Figure 4:
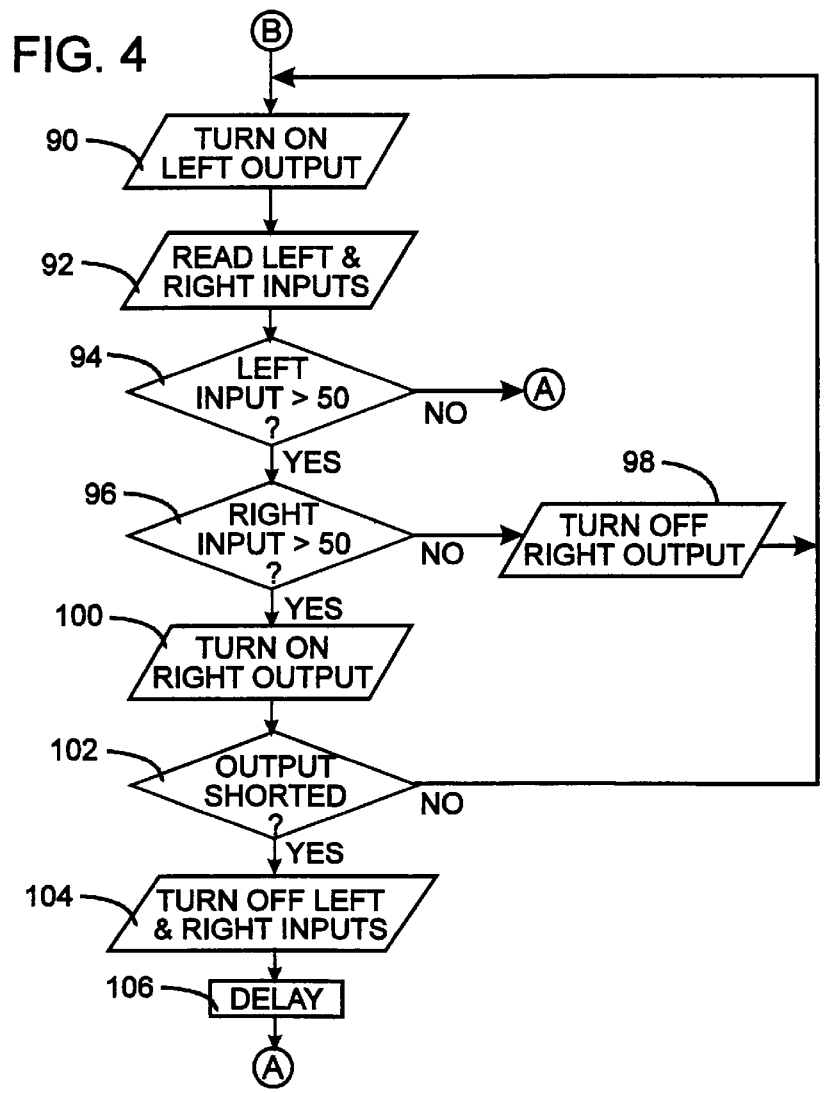
FIGS. 3–5 are flowcharts of a control program executed by a microcontroller in FIG. 2.
Figure 5:
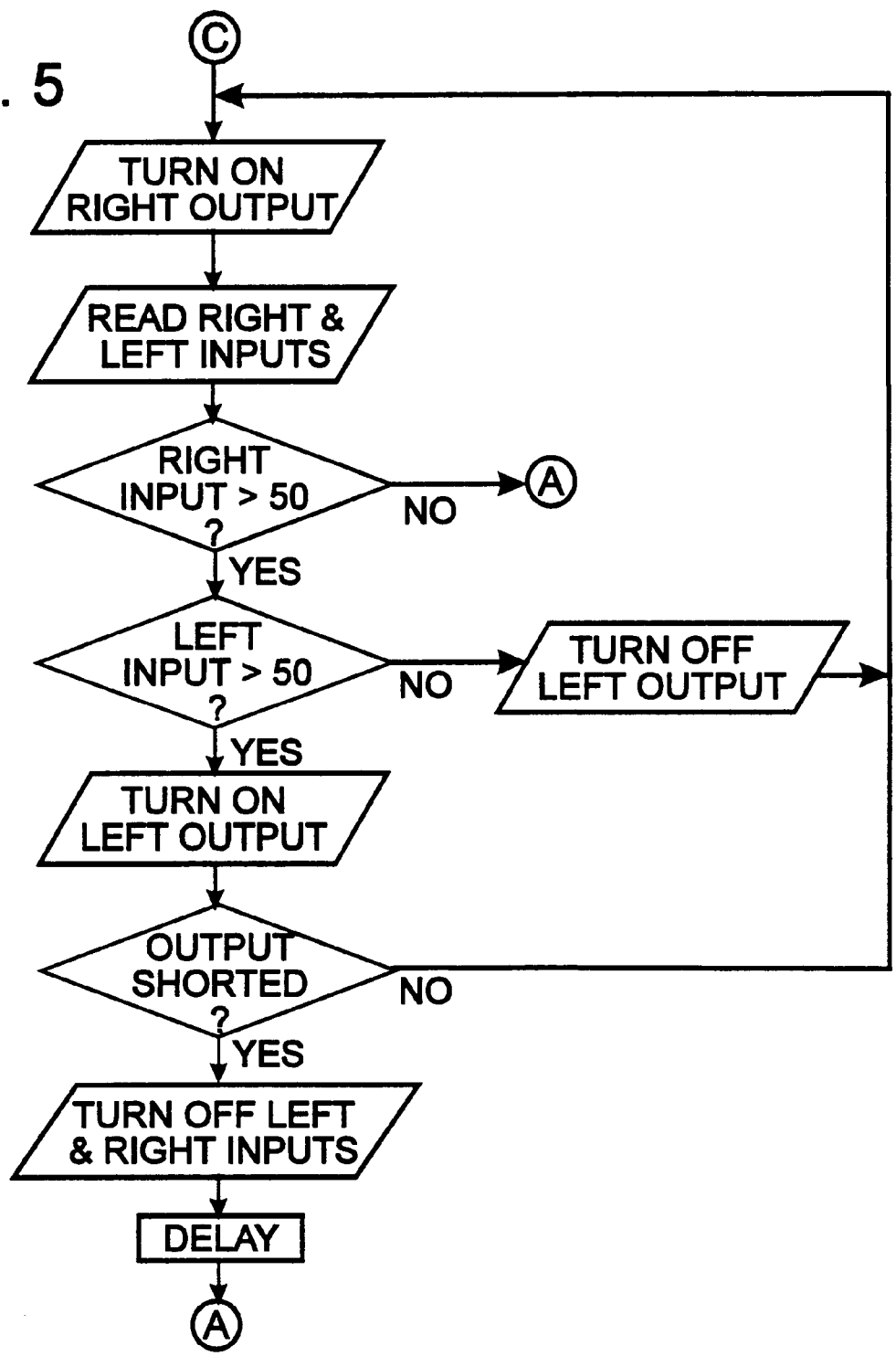

In the event of a right or left turn condition, the program will jump to the appropriate turning routine shown in FIGS. 4 and 5, respectively. While executing these routines, the turn outputs 16 and 17 are controlled in accordance with the ASAE specifications.

With reference to FIG. 4, the right turn mode commences at step 90 where the LEFT output 41 of the microcontroller 24 is turned on to steadily illuminate the left turn indicator lamp 16. Then the RIGHT and LEFT microcontroller inputs 25 and 29 for the hazard warning signals are read at step 92. The LEFT input 29 is examined at step 94 to determine whether its value is greater than 50, thereby indicating that this input is active. A lesser digital value is used as a threshold at this juncture because the voltage levels may be lower due to a greater electrical load from the additional lamps and driving some lamps constantly. At this point in the program, the LEFT input 29 eventually will be found to be low when the tractor no longer is turning right, as the previously steadily active signal at the left hazard terminal 20 will have returned to a flashing mode. Thus a LEFT microcontroller input of less than 50 at step 94 causes the program to return to step 60 and turn off both turn indicator lamps 16 and 17 of the towed vehicle.

Otherwise a high input state at step 94 causes execution of step 96 at which RIGHT input 25 is examined to determine whether its value is greater than 50, thereby indicating that this input is active. If the RIGHT input 25 is inactive, as occurs in the right turn mode between flashes of the right hazard warning lamp, the RIGHT microcontroller output 42 is disabled to turn off the right turn indicator lamp 17.

When the RIGHT input 25 is active and has a value greater than 50 at step 96, the microcontroller 24 turns on the RIGHT output 42 for the right turn indicator lamp 17. The program keeps looping through steps 90–102 while the tractor is making a right turn, which maintain the left turn indicator lamp 16 illuminated constantly while flashing the right turn indicator lamp 17.

At step 102 the microcontroller 24 examines the input which receives the condition signals from the smart field effect transistors 44 and 52. This examination determines whether the transistors are overheating or conducting excessive current as occur during a short circuit at the associated indicator lamp 16 or 17. Specifically, if the signal level at input 45 indicates an over current or high temperature condition of the output transistors 44 and 52, the program execution branches to step 104 where both turn indicator outputs 41 and 42 are turned off to render the transistors nonconductive. This action provides a protection mechanism for those transistors 44 and 52. Microcontroller 24 then suspends step 106 where program execution is suspended for a given period of time, ten seconds for example. The program returns to step 60 after the delay. Thereafter, if the tractor continues to make a right turn, the program progresses again to the right turn routine of FIG. 4 where steps 104 and 106 are executed again should the problem still exist.

Referring again to FIG. 3, when the tractor is making a left turn, the execution will jump from step 84 to a left turn routine depicted in FIG. 5 which functions in a similar manner to the right turn routine of FIG. 4 described immediately above.

I claim:

1. A lighting system for a towed vehicle which is adapted to be connected to a towing vehicle, said lighting system comprising:

a first conductor for receiving a right hazard signal from the towing vehicle;

a right hazard lamp connected to the first conductor for energizing by the right hazard signal;

a second conductor for receiving a left hazard signal from the towing vehicle;

a left hazard lamp connected to the second conductor for energizing by the left hazard signal;

a right turn indicator lamp;

a first switch selectively connecting the right turn indicator lamp to the first conductor;

a left turn indicator lamp;

a second switch selectively connecting the left turn indicator lamp to the second conductor;

a control circuit having inputs coupled to the first conductor and the second conductor, and having outputs connected to the first switch and the second switch, the control circuit responding to the first and left hazard signals changing states substantially in synchronism by rendering the first switch and the second switch nonconductive, and responding to the first and left hazard signals changing states asynchronously by rendering the first switch and the second switch conductive.

2. The lighting system as recited in claim 1 wherein the control circuit comprises a microcontroller.

3. The lighting system as recited in claim 1 further comprising:

a first voltage divider connected to the first conductor and having a first intermediate node connected to the control circuit; and a second voltage divider connected to the second conductor and having a second intermediate node connected to the control circuit.

4. The lighting system as recited in claim 1 further comprising a power supply having an input connected to at least one of the first conductor and the second conductor, and having an output connected to the control circuit.

5. The lighting system as recited in claim 1 further comprising a power supply comprising a first diode right connected between the hazard conductor and a node, a second diode connected between the second conductor and the node, and a storage capacitor connected to the node.

6. The lighting system as recited in claim 5 further comprising a voltage regulator having an input terminal connected to the first node, and having an output terminal from which electrical current is supplied to the control circuit.

7. The lighting system as recited in claim 1 wherein the first switch comprises a transistor having a first conduction path connecting the left turn indicator lamp to the second conductor and having a first control electrode connected to the control circuit; and the second switch comprises a transistor having a second conduction path connecting the left turn indicator lamp to the second conductor and having a second control electrode connected to the control circuit.

8. The lighting system as recited in claim 1 further comprising:

a first sensor which produces a first error signal upon detecting excessive current flowing through the first switch; and a second sensor which produces a second error signal upon detecting excessive current flowing through the second switch;

wherein the control circuit responds to the first error signal by rendering the first switch non-conductive and responds to the second error signal by rendering the second switch non-conductive.

9. The lighting system as recited in claim 1 wherein the control circuit comprises a comparator to determine when the first signal exceeds a given level and when the second signal exceeds a predefined level, thereby to determine when the first and second signals change states.

10. The lighting system as recited in claim 1 wherein the control circuit comprises:

an analog to digital converter for digitizing the right hazard signal and the left hazard signal into a first digital value and a second digital value respectively;

a first detector which renders both the first switch and the second switch non-conductive in response to the first and second digital values both being greater than or both being less than a predefined value;

a second detector which renders the first switch constantly conductive and renders the second switch alternately conductive and non-conductive in response to only the first digital value being greater than a given value; and a third detector which renders the second switch constantly conductive and renders the first switch alternately conductive and non-conductive in response to only the second digital value being greater than a predetermined value.

11. A method for controlling lamps on a towed vehicle which receives a right hazard signal and a left hazard signal from a towing vehicle, said method comprising:

applying the right hazard signal to a right hazard lamp;

applying the left hazard signal to a left hazard lamp;

sensing whether the first and left hazard signals change states substantially in synchronism;

connecting a right turn indicator lamp in common with the right hazard lamp in response to the first and left hazard signals changing states asynchronously;

disconnecting a right turn indicator lamp from the right hazard lamp in response to the first and left hazard signals changing states substantially in synchronism;

connecting a left turn indicator lamp in common with the left hazard lamp in response to the first and left hazard signals changing states asynchronously; and disconnecting a left turn indicator lamp from the left hazard lamp in response to the first and left hazard signals changing states substantially in synchronism.

12. The method as recited in claim 11 wherein sensing whether the first and left hazard signals change states substantially in synchronism comprises comparing the first signal to a given level and comparing the second signal to a predefined level.

13. The method as recited in claim 11 wherein sensing whether the first and left hazard signals change states substantially in synchronism comprises:

digitizing the right hazard signal and the left hazard signal into a first digital value and a second digital value respectively;

determining when the right hazard signal and the left hazard signal are both greater than predefined value and in response thereto rendering the first switch and the second switch non-conductive; and means responsive to the detector indicating that only the right hazard signal is less than predefined value by rendering the second switch steadily conductive and rendering the first switch alternately conductive and non-conductive.

* * * * *